(12) United States Patent
Chu et al.

(10) Patent No.: US 10,638,305 B1
(45) Date of Patent: Apr. 28, 2020

(54) POLICY BASED LOCATION PROTECTION SERVICE

(71) Applicant: Citrix Systems, Inc., Fort Lauderdale, FL (US)

(72) Inventors: Xiaolu Chu, Nanjing (CN); Dai Li, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/157,260

(22) Filed: Oct. 11, 2018

(51) Int. Cl.
*H04W 8/16* (2009.01)
*H04W 4/02* (2018.01)
*H04W 12/02* (2009.01)

(52) U.S. Cl.
CPC ............. *H04W 8/16* (2013.01); *H04W 4/02* (2013.01); *H04W 12/02* (2013.01)

(58) Field of Classification Search
CPC ....... H04W 12/02; H04W 4/029; H04W 8/16; G06F 21/6245; G06F 21/60; G06F 2221/2111; H04L 63/20; H04L 67/18
See application file for complete search history.

(56) References Cited

U.S. PATENT DOCUMENTS

| | | | | |
|---|---|---|---|---|
| 5,812,865 A * | 9/1998 | Theimer | ................. | G06F 9/547 379/88.13 |
| 8,473,729 B2 * | 6/2013 | Trethewey | .......... | G06F 21/6245 713/2 |
| 8,479,299 B1 * | 7/2013 | Cooley | ............... | G06F 21/6245 726/26 |
| 8,621,554 B1 * | 12/2013 | Yu | ............................ | H04W 4/21 726/1 |
| 9,161,155 B2 * | 10/2015 | Roh | ...................... | H04W 4/029 |
| 9,317,713 B2 * | 4/2016 | Wong | ................. | G06F 21/6245 |
| 9,356,961 B1 * | 5/2016 | Todd | .................. | H04L 63/1441 |
| 9,450,984 B2 * | 9/2016 | Yu | ........................... | H04W 8/16 |
| 10,032,037 B1 * | 7/2018 | Allen | ................. | G06F 21/6245 |
| 10,509,910 B2 * | 12/2019 | Mahaffey | .............. | G06F 21/577 |
| 10,509,911 B2 * | 12/2019 | Mahaffey | ............ | H04L 63/1425 |
| 2010/0024045 A1 * | 1/2010 | Sastry | ................ | G06F 21/6245 726/28 |
| 2011/0167474 A1 * | 7/2011 | Sinha | ...................... | G06F 21/51 726/1 |
| 2012/0009897 A1 * | 1/2012 | Kasad | ................... | H04L 63/107 455/411 |
| 2014/0289850 A1 * | 9/2014 | Yu | ........................... | H04W 8/16 726/22 |

(Continued)

*Primary Examiner* — Matthew C Sams
(74) *Attorney, Agent, or Firm* — Fox Rothschild LLP; Robert J. Sacco; Carol E. Thorstad-Forsyth

(57) ABSTRACT

Systems and methods for providing privacy protection with regard to location data of an electronic device. The methods comprise: receiving a request to access the location data of the electronic device; determining a privacy protection level associated with the electronic device based on condition related information of the electronic device; blocking access to the location data of the electronic device by the software application based on the privacy protection level; modifying the location data to generate remapped location data of the electronic device based on the privacy protection level associated with the electronic device; and providing the remapped location data to the software application so as to operate the software application without using the location data of electronic device.

11 Claims, 11 Drawing Sheets

(56) References Cited

U.S. PATENT DOCUMENTS

| | | | | |
|---|---|---|---|---|
| 2014/0370916 | A1* | 12/2014 | Hines | H04W 4/14 |
| | | | | 455/456.1 |
| 2015/0121535 | A1* | 4/2015 | Fiss | G06F 21/6218 |
| | | | | 726/26 |
| 2016/0314318 | A1* | 10/2016 | Li | G06F 21/6263 |
| 2016/0316332 | A1* | 10/2016 | Bai | H04W 4/023 |

* cited by examiner

| Privacy Protection Level 404 | Condition Related Information 402 ||||||||  |
|---|---|---|---|---|---|---|---|---|---|
|  | Device Owner | Application User | Application Type | Application Reputation | Device Location | Heading Direction | Time | Date |  |
| 1 | Paul | Paul | Banking | Exceptional | 10°N,70°W | Office | 8 AM | Mon. 1/19 |  |
| 1 | Paul | Paul | Remote Access | Exceptional | 20°S,50°E | Home | 10 PM | Mon. 1/19 |  |
| 2 | Paul | Paul | Shopping | Good | 30°S,90°W | Home | 2 PM | Sat. 1/17 |  |
| 3 | Paul | Paul | Routing | Average | 15°N,40°E | School | 11 AM | Wed. 1/21 |  |
| 4 | Paul | Paul | Searching | Moderate | 5°N,15°E | Restaurant | 7 PM | Sat. 1/17 |  |
| 5 | Paul | Paul | Gaming | Poor | 25°S,40°E | Friends Home | 2 PM | Sat. 1/17 |  |
| ----- | ----- | ----- | ----- | ----- | ----- | ----- | ----- | ----- | ----- |
| 5 | Paul | Jenn | Gaming | Poor | 25°N,30°E | Restaurant | 8 AM | Mon. 1/19 |  |

FIG. 5

| Privacy Protection Level 404 | Access To Location Information | Radius | Differential Modification Algorithms |
|---|---|---|---|
| 1 | Denied | Infinity | --- |
| 2 | Denied | 35±5 Miles | Modification Algorithm 604 |
| 3 | Denied | 10±5 Miles | Modification Algorithm 606 |
| 4 | Allowed | --- | --- |
| 5 | Allowed | --- | --- |
| | | | ------- |

POLICY BASED LOCATION PROTECTION SERVICE

BACKGROUND

Statement of the Technical Field

The present disclosure relates generally to computing systems. More particularly, the present disclosure relates to implementing systems and methods for providing a policy based location protection service.

Description of the Related Art

The growing popularity of location-based systems, allowing unknown/untrusted servers to easily collect huge amounts of information regarding users' locations, has recently started raising serious privacy concerns, such as where a person has been and/or is predicted to go. In most cases, especially for a mobile device, once a software application has been granted access to the device's location, the person's privacy becomes transparent to that software application. For example, once a business application is granted access to the device's location, this business application knows where the device is at all times including business hours and non-business hours.

SUMMARY

The present disclosure concerns implementing systems and methods for providing privacy protection with regard to location data of an electronic device. The methods comprise: receiving a request to access the location data of the electronic device; determining a privacy protection level associated with the electronic device based on condition related information of the electronic device; blocking access to the location data of the electronic device by the software application based on the privacy protection level; modifying the location data to generate remapped location data of the electronic device based on the privacy protection level associated with the electronic device; and providing the remapped location data to the software application so as to operate the software application without using the location data of electronic device.

In some scenarios, the privacy protection level is determined based on condition related information specifying an electronic device context. The condition related information is obtained from the electronic device or a remote datastore. The electronic device context is a product of at least one of the electronic device's owner, the software application's user, the software application's type, the software application's reputation, a heading direction, the precise location, a date and a time. The blocking comprises comparing the privacy protection level value to a threshold value. The modifying the location data comprises randomly selecting a location within a geographic area representing the privacy protection level associated with the electronic device. The geographic area has a radius selected based on the privacy protection level.

In those or other scenarios, the privacy protection level is a first privacy protection level associated with the electronic device. A second privacy protection level associated with the electronic device is generated that is different from the first privacy protection level. The methods further comprise allowing the software application access to the location data when the privacy protection level is equal to or greater than a threshold value.

BRIEF DESCRIPTION OF THE DRAWINGS

The present solution will be described with reference to the following drawing figures, in which like numerals represent like items throughout the figures.

FIG. 5 provides an illustrative look-up table that is used to determine the privacy protection level based on the existing conditions defined by the above-listed information.

FIG. 6 provides an illustrative look-up table showing how a privacy protection level can be used to facilitate a remapping or obscuring of location information.

DETAILED DESCRIPTION

Figure 1:
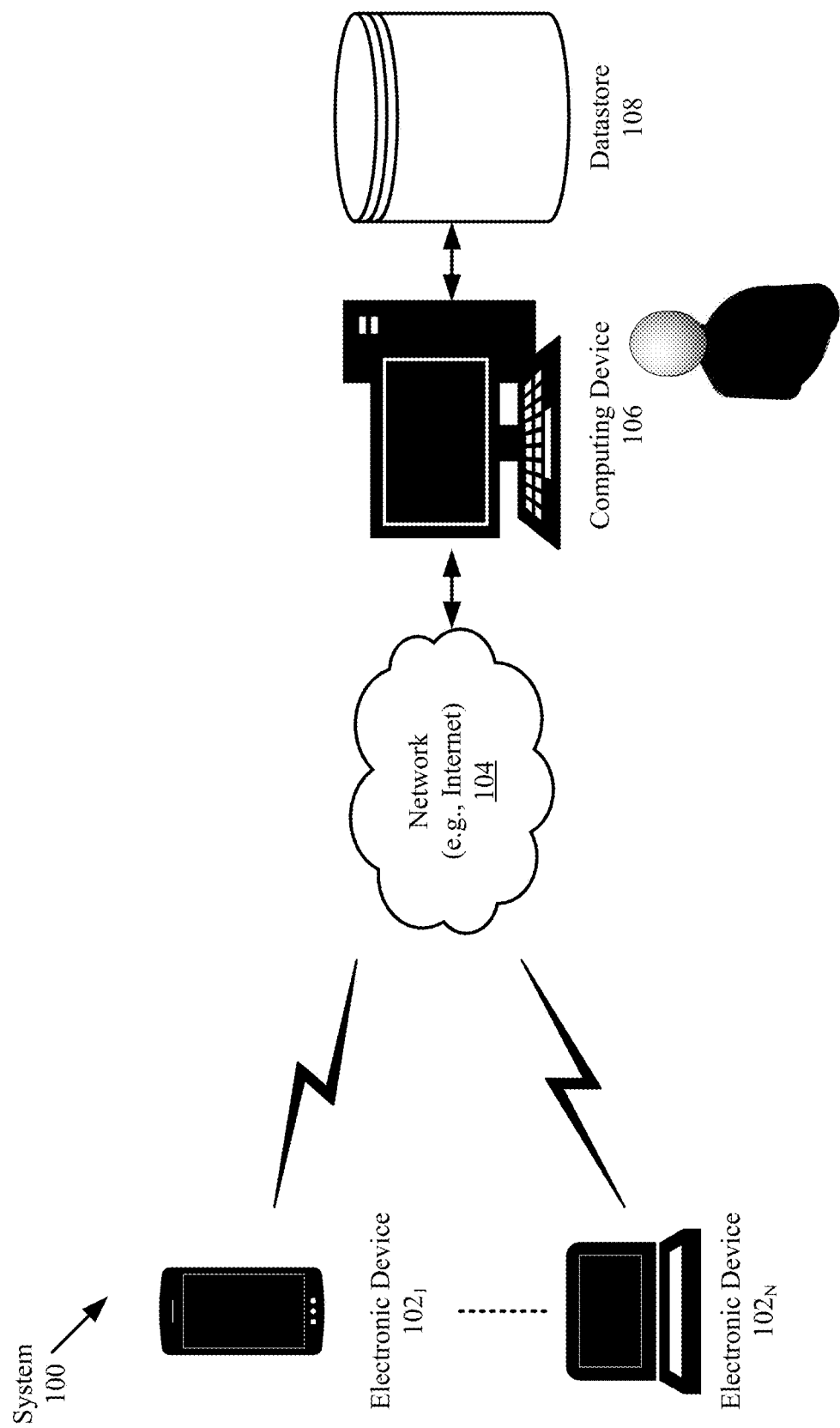
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

People find it frustrating that their whereabouts are known by software applications (such as those discussed in the background section of this document) without any contextual evaluation. The present solution provides a way to address this frustration. In this regard, the present solution provides a policy-based service that protects the privacy of location data retrieved from devices such as a mobile device, an Internet of Things ("IoT") and an endpoint of a network. This protection is achieved by: performing a contextual evaluation using location information to detect certain conditions; and allowing or blocking access to location information and/or the rewriting of location information when certain conditions are detected. The contextual evaluation can involve determining an owner of an electronic device, determining when a given software application is in use, identifying the person using the software application being executed by the electronic device, determining where the person is currently located, determining when the person is or was located at a given location, determining the type of software application or micro-application accessing the location information, determining a reputation of the software application or micro-application accessing the location information, determining a protection level methodology implemented by the software application, determining a potential heading direction, and/or determining a potential path of travel of a mobile device.

Conventionally, access to location information has been easily granted to software applications during a one-time configuration process (e.g., at installation time) and provided without any contextual limitations. By introducing a policy-based location protection service, the following is made possible: a determination as to whether a given software application is able to access and/or retrieve precise location information; a detection of an existence of certain conditions; a blocking of the software application's access and/or retrieval of the precise location information when certain conditions exist; a selective modification of the precise location information to generate censored location information; and/or the provision of the censored location information to the software application.

Referring now to FIG. 1, there is provided an illustration of an illustrative system 100. System 100 is generally configured to provide a service to a plurality of electronic devices $102_1, \ldots, 102_N$. The service provides privacy protection with regard to the electronic devices' whereabouts. The electronic devices $102_1, \ldots, 102_N$ include, but are not limited to, mobile phones, personal computers, laptops, tablets, personal digital assistants, IoTs and/or other network end nodes. The electronic devices $102_1, \ldots, 102_N$ are configured to communicate information to and from a remote computing device 106 (e.g., a server) via a network (e.g., the Internet or Intranet) 104.

The information communicated from the devices $102_1, \ldots, 102_N$ to the remote computing device 106 comprises condition related information. The condition related information includes, but is not limited to, device owners, application users, application reputations, device locations, heading directions, time and/or dates. Some or all of this information may also be retrieved by the remote computing device 106 from a datastore 108. The datastore 108 is provided to store information. The datastore can include, but is not limited to, a database.

The condition related information is used by the remote computing device 106 to determine privacy protection levels respectively for the electronic devices $102_1, \ldots, 102_N$. Each privacy protection level represents one of a plurality of different levels of privacy protection. The privacy protection levels are then communicated from the remote computing device 106 to the electronic devices $102_1, \ldots, 102_N$. Each electronic device uses its respective privacy protection level to dynamically select or determine a radius value. The radius value can be selected from a pre-stored list of radius values. Alternatively, the radius value can be computed using a chaotic, random, or pseudo-random number generation algorithm, to name just a few examples. Chaotic, random or pseudo-random number generation algorithms are well known in the art, and therefore will not be described herein. Any known or to be known chaotic, random or pseudo-random number generation algorithm can be used herein without limitation. Next, the electronic device performs operations to randomly select a location with a circle area defined by the electronic device's actual location and the radius. The randomly selected location is then used to remap the electronic device's actual location in order to achieve geo-indistinguishability by adding controlled random noise thereto, as will be described in relation to FIG. 7 below. The remapped location is provided to one or more location using software applications running on or being executed by the electronic device.

The above process is based on a differential privacy theory. Differential privacy is the statistical science of trying to learn as much as possible about a group while learning as little as possible about any individual in the group. A tradeoff can be achieved between authorized or unauthorized servers and individuals. Relevant research departments can make the best advantage of location data. Individual privacy can also be protected.

Figure 2:
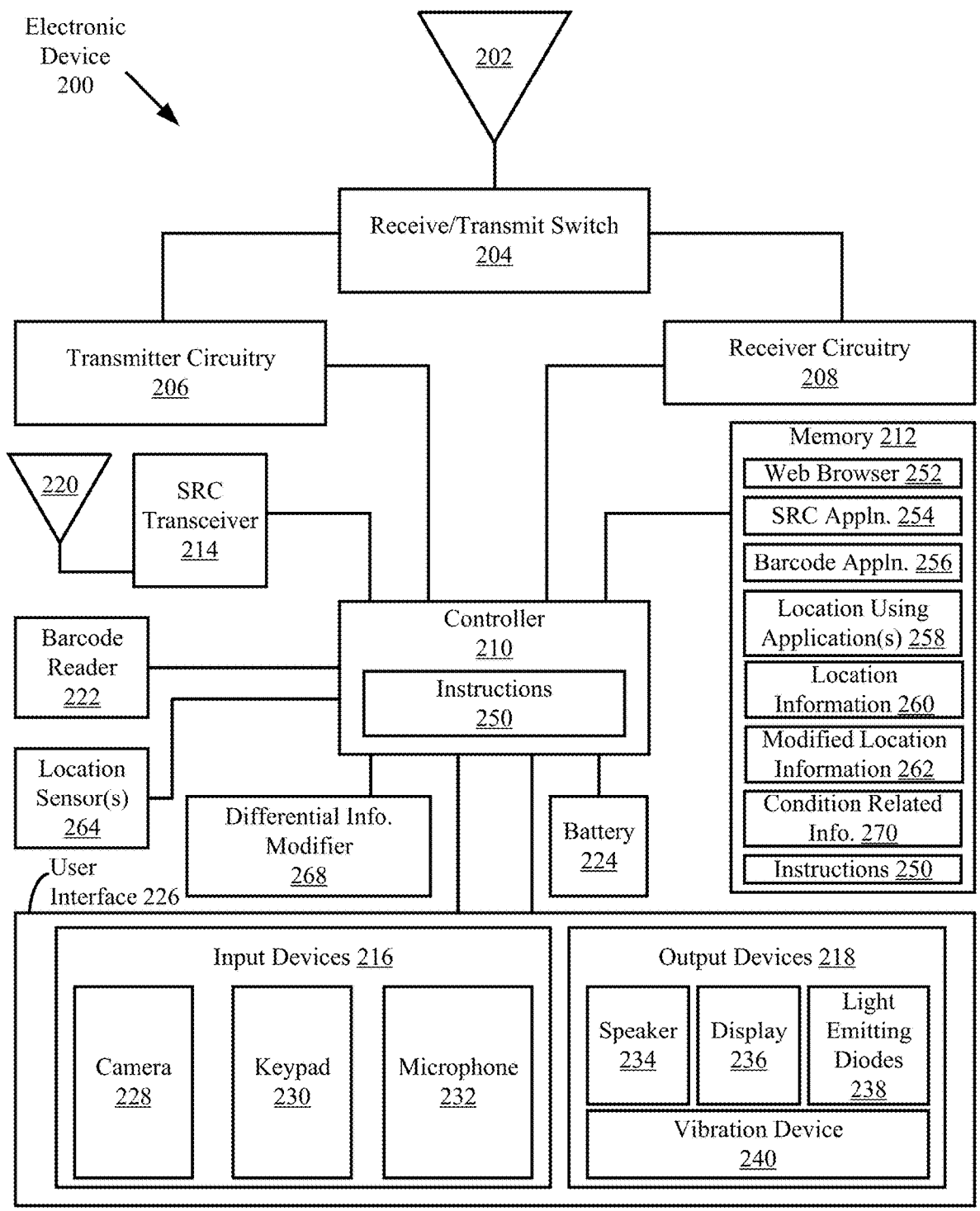
FIG. 2 is an illustration of an illustrative architecture for an electronic device.

Referring now to FIG. 2, there is provided an illustration of an illustrative electronic device 200. Electronic device 200 can include, but is not limited to, a mobile device (e.g., a smart phone, a personal digital assistant, a personal computer, etc.), an IoT or a network node (e.g., an end point).

Electronic device 200 may include more or less components than those shown in FIG. 2. However, the components shown are sufficient to disclose an illustrative embodiment implementing the present solution. Some or all of the components of the electronic device 200 can be implemented in hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As noted above, the electronic device 200 can include, but is not limited to, a notebook computer, a personal digital assistant, a cellular phone or a mobile phone with smart device functionality (e.g., a Smartphone). In this regard, the electronic device 200 comprises an antenna 202 for receiving and transmitting Radio Frequency ("RF") signals. A receive/transmit ("Rx/Tx") switch 204 selectively couples the antenna 202 to the transmitter circuitry 206 and the receiver circuitry 208. The receiver circuitry 208 demodulates and decodes the RF signals received from an external device. The receiver circuitry 208 is coupled to a controller (or microprocessor) 210 via an electrical connection. The receiver circuitry 208 provides the decoded signal information to the controller 210. The controller 210 uses the decoded RF signal information in accordance with the function(s) of the electronic device 200. The controller 210 also provides information to the transmitter circuitry 206 for encoding and modulating information into RF signals. Accordingly, the controller 210 is coupled to the transmitter circuitry 206 via an electrical connection. The transmitter circuitry 206 communicates the RF signals to the antenna 202 for transmission to an external device via the Rx/Tx switch 204.

The electronic device 200 also comprises an antenna 220 coupled to a Short Range Communications ("SRC") transceiver 214 for receiving SRC signals. SRC transceivers are well known in the art, and therefore will not be described in detail herein. However, it should be understood that the SRC transceiver 214 processes the SRC signals to extract information therefrom. The SRC transceiver 214 may process the SRC signals in a manner defined by the SRC application 254 installed on the electronic device 200. The SRC application 254 can include, but is not limited to, a Commercial Off the Shelf ("COTS") application (e.g., a Bluetooth application). The SRC transceiver 214 is coupled to the controller 210 via an electrical connection. The controller 210 uses the extracted information in accordance with the function(s) of the electronic device 200.

The controller 210 may store received and extracted information in memory 212 of the electronic device 200. Accordingly, the memory 212 is connected to and accessible by the controller 210 through electrical connection. The memory 212 may be a volatile memory and/or a non-volatile memory. For example, memory 212 can include, but is not limited to, a Random Access Memory ("RAM"), a Dynamic RAM ("DRAM"), a Read Only Memory ("ROM") and a flash memory. The memory 212 may also comprise unsecure memory and/or secure memory. The unsecure memory is memory that is not protected from tampering. The secure memory is memory that has at least one measure to protect against tampering. The memory 212 can be used to store location information 260, 262 and other information therein. The other information can include, but is not limited to, authentication information, cryptographic information, and user account information, just to name a few examples.

The electronic device 200 also may comprise a barcode reader 222. Barcode readers are well known in the art, and therefore will not be described herein. However, it should be understood that the barcode reader 222 is generally configured to scan a barcode and process the scanned barcode to extract information therefrom. The barcode reader 222 may process the barcode in a manner defined by the barcode application 256 installed on the electronic device 200. Additionally, the barcode scanning application can use camera 228 to capture the barcode image for processing. The barcode application 256 can include, but is not limited to, a COTS application. The barcode reader 222 provides the extracted information to the controller 210. As such, the barcode reader 222 is coupled to the controller 210 via an electrical connection. The controller 210 uses the extracted information in accordance with the function(s) of the electronic device 200.

As shown in FIG. 2, one or more sets of instructions 250 are stored in memory 212. The instructions may include customizable instructions and non-customizable instructions. The term customizable instructions refers to instructions that can be customized by a user. The term non-customizable instructions refers to instructions that cannot be customized by a user. The instructions 250 can also reside, completely or at least partially, within the controller 210 during execution thereof by electronic device 200. In this regard, the memory 212 and the controller 210 can constitute machine-readable media. The term "machine-readable media", as used herein, refers to a single medium or multiple media that stores one or more sets of instructions 250. The term "machine-readable media", as used here, also refers to any medium that is capable of storing, encoding or carrying the set of instructions 250 for execution by the electronic device 200 and that causes the electronic device 200 to perform one or more of the methodologies of the present disclosure.

The controller 210 is also connected to a user interface 226. The user interface 226 comprises input devices 216, output devices 218 and software routines (not shown in FIG. 2) configured to allow a user to interact with and control software applications (e.g., software applications 252-258 and other software applications) installed on the electronic device 200. Such input and output devices may include, but are not limited to, a display 236, a speaker 234, a keypad 230, a directional pad (not shown in FIG. 2), a directional knob (not shown in FIG. 2), a microphone 232, and a camera 228. The display 236 may be designed to accept touch screen inputs. As such, user interface 226 can facilitate a user software interaction for launching applications (e.g., software applications 252-258 and other software applications) installed on the electronic device 200. The user interface 226 can facilitate a user-software interactive session for initiating communications with an external device (e.g., computing device 106 of FIG. 1); and/or launching applications 252-258.

The display 236, keypad 230, directional pad (not shown in FIG. 2) and directional knob (not shown in FIG. 2) can collectively provide a user with a means to initiate one or more software applications or functions of the electronic device 200. The application software 252-258 can facilitate the data exchange between (a) a user and the electronic device 200, and (b) the electronic device 200 and an external computing device 106. In this regard, the application software 252-258 performs one or more of the following: verify the identity of a user of electronic device 200 via an authentication process; present information to the user indicating this his/her identity has or has not been verified;

present a Graphical User Interface ("GUI") to the user for enabling the user to subscribe to a service for providing privacy protection with regard it his(her) whereabouts. The service facilitates the following operations: communicating condition related information 270 to the external device; selectively blocking software application(s) 258 access to location information 260 specifying the precise location of the electronic device; modifying the location information 260 to generate modified location information 262 specifying a remapped or obscured location for the electronic device; and/or providing the modified location information 262 to location using software application(s) 258.

The location sensor 264 is configured to generate information indicating a precise location for the electronic device. The location sensor 264 can include, but is not limited to, GPS sensors. The battery 224 can include any known or to be known battery, and optionally be rechargeable. The vibration device 240 is configured to provide a tactile output comprising vibration. The light emitted diodes 238 can include any known or to be known light emitting diode. The differential modifier 268 includes hardware and/or software configured to implement one or more of the methodologies, procedures, or functions described herein. The operations of the differential modifier 268 are evident from the discussion.

Figure 3:
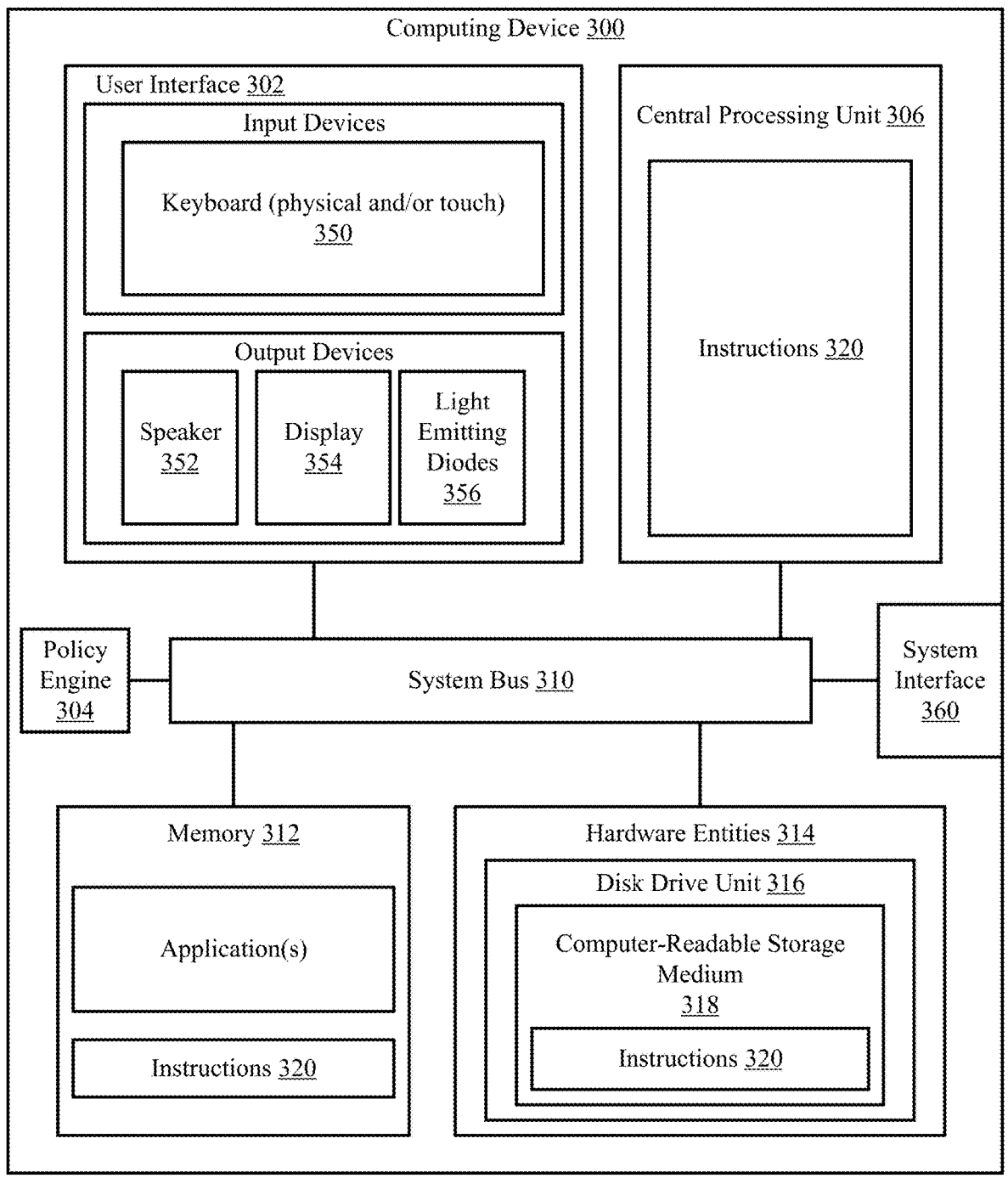
FIG. 3 is an illustration of an illustrative architecture for a computing device.

Referring now to FIG. 3, there is provided an illustration of an illustrative architecture for a computing device 300. Computing device 106 of FIG. 1 is the same as or similar to computing device 300. As such, the discussion of computing device 300 is sufficient for understanding this component of system 100.

In some scenarios, the present solution is used in a client-server architecture. Accordingly, the computing device architecture shown in FIG. 3 is sufficient for understanding the particulars of client computing devices and servers.

Computing device 300 may include more or less components than those shown in FIG. 3. However, the components shown are sufficient to disclose an illustrative solution implementing the present solution. The hardware architecture of FIG. 3 represents one implementation of a representative computing device configured to provide improved email attachment viewing, as described herein. As such, the computing device 300 of FIG. 3 implements at least a portion of the method(s) described herein.

Some or all components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit ("CPU") 306, a system bus 310, a memory 312 connected to and accessible by other portions of computing device 300 through system bus 310, a system interface 360, and hardware entities 314 connected to system bus 310. The user interface 302 can include input devices and output devices, which facilitate user-software interactions for controlling operations of the computing device 300. The input devices include, but are not limited, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356. System interface 360 is configured to facilitate wired or wireless communications to and from external devices (e.g., network nodes such as access points, etc.).

At least some of the hardware entities 314 perform actions involving access to and use of memory 312, which can be a Radom Access Memory ("RAM"), a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

The policy engine 304 includes hardware and/or software configured to implement one or more of the methodologies, procedures, or functions described herein. The operations of the policy engine 304 are evident from the discussion.

Figure 4:
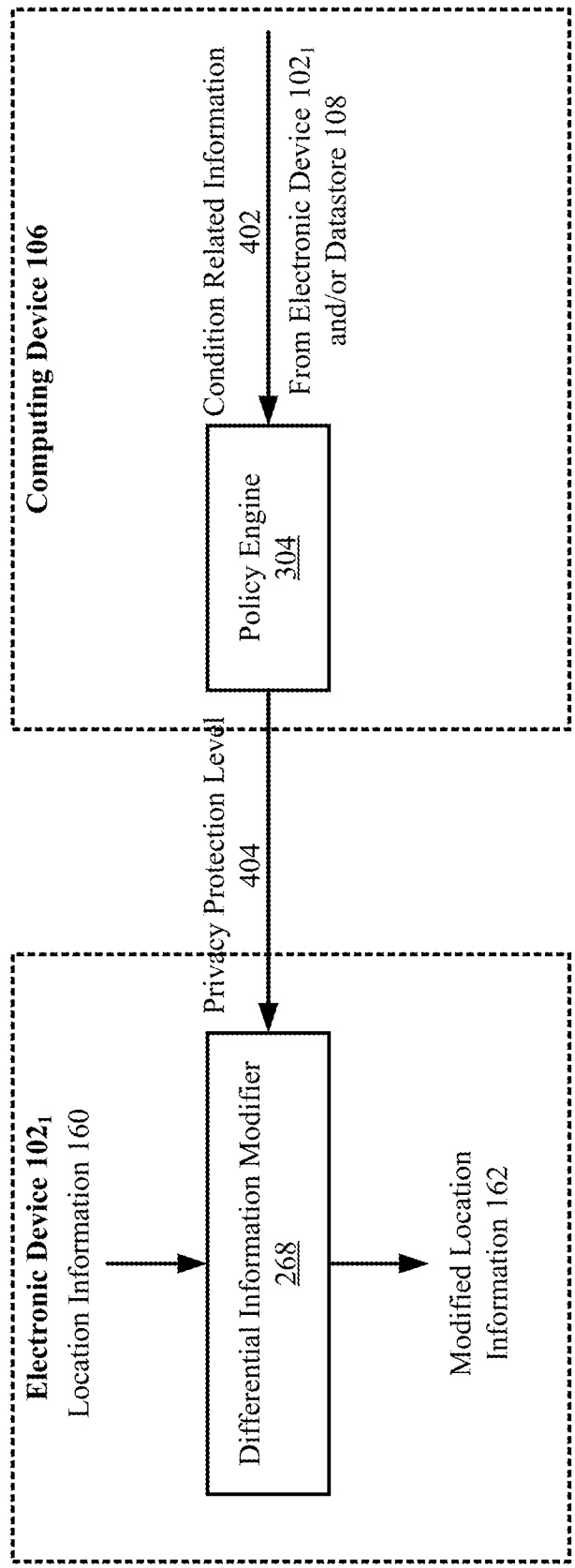
FIG. 4 provides an illustration showing an illustrative workflow in accordance with the present solution.

Referring now to FIG. 4, there is provided an illustration that is useful for understanding the present solution. As noted above, the present solution provides a service for protecting the privacy of people whereabouts. This privacy protection is provided by implementing a privacy protection framework. The term "privacy protection framework" refers to the underlying hardware and/or software for implementing the present solution. The privacy protection framework consist of four parts: a precise location for an electronic device (e.g., GPS location determined by GPS sensors 264 of FIG. 2); a policy engine for determining a privacy protection level associated with the electronic device; a remapped or obscured location for the electronic device; and a differential privacy protection technique for determining the remapped or obscured location in accordance with the privacy protection level. In some scenarios, the remapped or obscured location is generated by adding controlled noise to the precise location based on a controlled privacy protection level. The purpose of and manner in which the controller noise is added to the precise location will become evident as the discussion progresses.

During operations, condition related information 402 is analyzed by a policy engine 304 of the computing device 106 to select or determine a privacy protection level 404 that is appropriate or desired for given existing conditions associated with the electronic device $102_1$. The condition related information includes, but is not limited to, a device owner, an application user, an application reputation, a device location, a heading direction, a time and/or a date.

In order to determine the privacy protection level 404, the policy engine 304 first performs a context based evaluation of the condition related information 402 using at least one of the following information: device owner; application user; application user's role; application type (e.g., business application, remote access application, social application, banking application, shopping application, searching application, and/or gaming application); application reputation for end user privacy violations; a time/date a device or application is in use; location at which the device or application is in use; and/or a heading direction of the device. For example, the time/date can be used in conjunction with a personal calendar to determine if the device or application is in use during business hours, off shift hours, weekend hours, sick time hours, or paid time off hours. The location can be used to determine if the user is in a trusted zone or an untrusted zone. A trusted zone is a geographic area which is secured and/or monitored by a security device. An untrusted zone is a geographic area which is not secured and/or monitored by a security device. Based on the above-listed information, the policy engine 304 selects, determines or computes a privacy protection level.

In the scenario shown in FIG. 5, a look-up table is used to determine the privacy protection level 404 based on the existing conditions defined by the above-listed information. The look-up table can be pre-defined, generated based on user input, or generated based on sensor data. The contents of the look-up table can be updated periodically or continuously. The look-up table can be stored in datastore 108 and/or a memory of computing device 106. The present solution is not limited in this regard. Other techniques can be used to select or compute the privacy protection level.

Referring again to FIG. 4, the privacy protection level 404 is forwarded to the electronic device $102_1$. At the electronic device $102_1$, the privacy protection level 404 is used by a controller 210 to selectively block or allow a software application's 258 access to location information 260, as shown by FIG. 6. For example, a software application 258 ability to access location information 260 is blocked when the privacy protection level is equal to, below or above a certain threshold level (e.g., 3) as indicated in the look-up table of FIG. 6. Techniques for blocking software applications access to data are well known in the art, and therefore will not be described herein. Any known or to be known technique for blocking a software's access to data can be used herein without limitation. The threshold level is pre-defined. If access is not blocked, then the location information 260 is provided to the location using software application 258. In contrast if access is blocked, then the privacy protection level 404 is also used by a differential information modifier 268 to dynamically remap the user's precise location specified by the location information 160 in accordance with a respective modification algorithm 602, 604, 606. The manner in which a location is dynamically remapped will become evident as the discussion progresses. The modification algorithm 602, 604, 606 is identified in the look-up table of FIG. 6 as being associated with the respective privacy protection levels. Accordingly, the privacy protection levels are used to determine and/or select the particular modification algorithm being used at a particular time. The remapped location is stored in a local memory 212 as modified location information 162. The remapped location specified by the modified location information 162 is then provided to a location using software application 258 rather than the user's actual location specified by the original precise location information 160.

Figure 7:
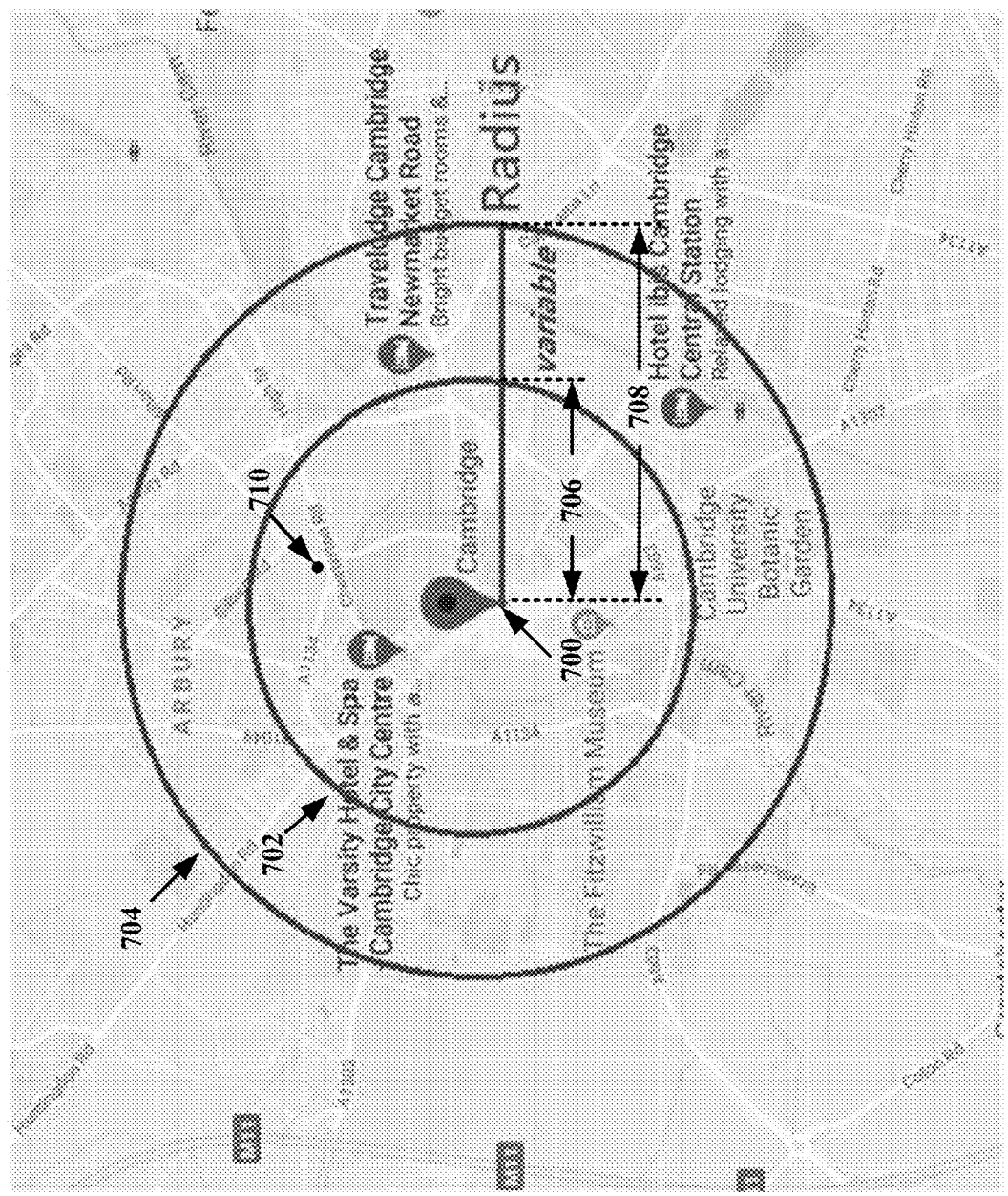
FIG. 7 provides an illustration that is useful for understanding how the user's actual location is remapped.

Referring now to FIG. 7, there is provided an illustration that is useful for understanding how the user's actual location is remapped. The differential information modifier 268 implements a notion of protecting the user's location within a circle area which indicates the privacy protection level 404, and corresponds to a generalized version of the concept of differential privacy. For example, a first circle area 702 is defined by a first radius 706 (which can be determined using a look-up table such as that shown in FIG. 6 using the privacy protection level) extending from a center point 700 comprising the person's precise location when the privacy protection level has a first value (e.g., 3), and a second circle area 704 is defined by a second radius 708 (which can be determined using a look-up table such as that shown in FIG. 6 using the privacy protection level) extending from a center point 700 comprising the person's precise location when the privacy protection level has a second value (e.g., 2). When a privacy protection level is determined, then the modified location information will reflect a device position of within a radius associated with the privacy protection level. For example, a privacy protection level 2, the modified location information indicates that the device is somewhere within the radius 708. Thus, the specific location 700 of the device is not particularly identified to the location using application. The present solution is not limited in this regard. For example, the radius value for a given privacy protection level can be infinite as shown in FIG. 6 in relation to a privacy protection level value of 1. The precise location coordinates are remapped into a random and/or irreversible location 710 inside a circle area 702, 704 with a variable radius R determined based on the user's actual location and the privacy protection level determined by the policy engine 304. The remapping generally adds controlled noise to the user's actual location. Furthermore, the differential modifier can be used to process 3D coordinates combined with altitude. The present solution covers <altitude & latitude>.

The present solution can be used in a variety of applications. For example, the present solution can be used with managed devices, managed applications, and virtualization application. Conventionally, software applications directly query the location information from location sensors (e.g., GPS sensors). The location sensors respond to the query with accurate location information. There is no middleware between the software application and the location sensors. Thus, the location sensors can simply answer the query via a response with the accurate location information. Accordingly, the software application is never provided obscured or protection location information. So, the person's privacy about his(her) whereabouts is under great risk of violation. Notably, most conventional software applications ask the user whether they want to share location data. These permission requests diminish the overall user experience from the software application. In addition, such permission requests user additional resources, which may be limited to some devices (e.g., mobile devices having limited supply of power). So, the conventional devices leave the user with a binary choice, to share or not to share location information. Not sharing location information can also diminish user experience for the software application by preventing the application from providing content that is most relevant to the user.

Managed Device Scenario

Figure 8:
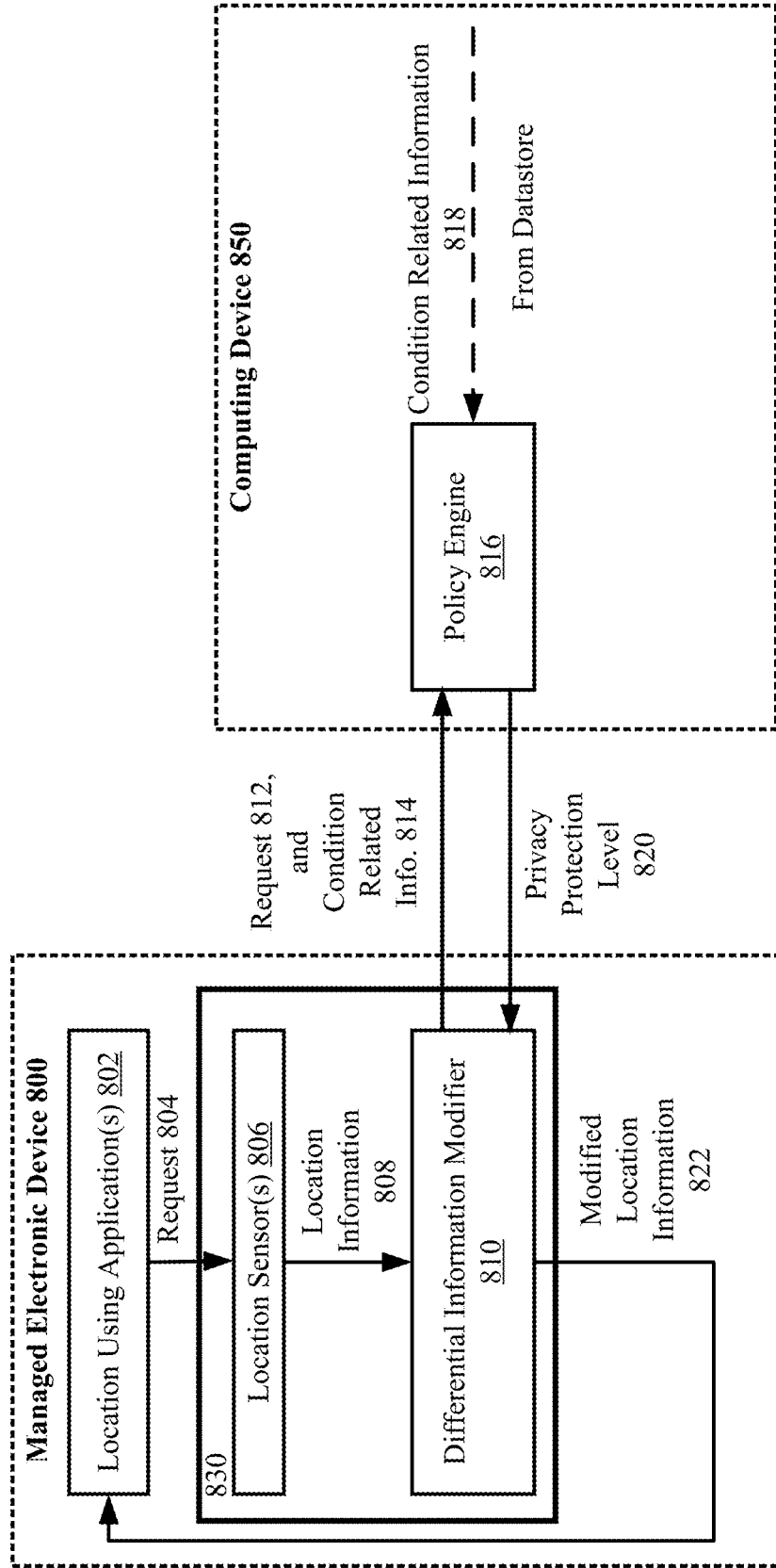
FIG. 8 provides an illustration that is useful for understanding a managed device based workflow implemented by a managed electronic device and a remote computing device.

Referring now to FIG. 8, there is provided an illustration that is useful for understanding a managed device based workflow implemented by a managed electronic device 800 and a remote computing device 850. Managed electronic device 800 can be the same as or similar to electronic device $102i, \ldots,$ or $102_N$ of FIG. 1. Similarly, computing device 850 can be the same as or similar to computing device 106 of FIG. 1. As such, the discussion provided above in relation to these devices of FIG. 1 is sufficient for understanding the devices of FIG. 8.

In managed device scenarios, the differential information modifier 810 and location sensor(s) 806 are integrated with each other so as to form a single component 830. When the location sensor(s) 806 respond(s) to a query or request 804 for location information from a location using application 802, the privacy protection framework including 810, 816 adds controllable noise to the location information 808 to generate modified location information to be used by application 802. In this way, all software applications 802, which run on this managed electronic device 800, can only get location information from the privacy protection framework 810, 816 rather than the location sensor(s) 806, and thus protect information that precisely or otherwise specifically identifies a user's whereabouts. For example, when the managed electronic device 800 enrolls with the computing device 850, a customer can choose whether to integrate the present solution (e.g., by registering with a service and/or downloading a software application). If so, at least a portion of the privacy protection framework 810, 816 is integrated with the location sensor(s) 806, which provides flexibility to a customer's experience.

The managed device based workflow involves: sending a request for location information 804 from a software application 802 to a location sensor 806; communicating location information 808 from the location sensor 806 to a differential information modifier 810 in response to the query; sending a request for a privacy protection level 812 and condition related information 814 from the differential information modifier 810 to a policy engine 816; optionally performing operations by the policy engine 816 to retrieve other condition related information 818 from a datastore; analyzing by the policy engine 816 the condition related information 814, 818; determining a privacy policy level based on results of the policy engine's analysis of the condition related information; communicating the privacy policy level 820 from the policy engine 816 to the differential information modifier 810; remapping or obscuring the location information 808 so as to generate modified location information 822; and providing the location information 808 to the location sensor 806.

Managed Applications

Figure 9:
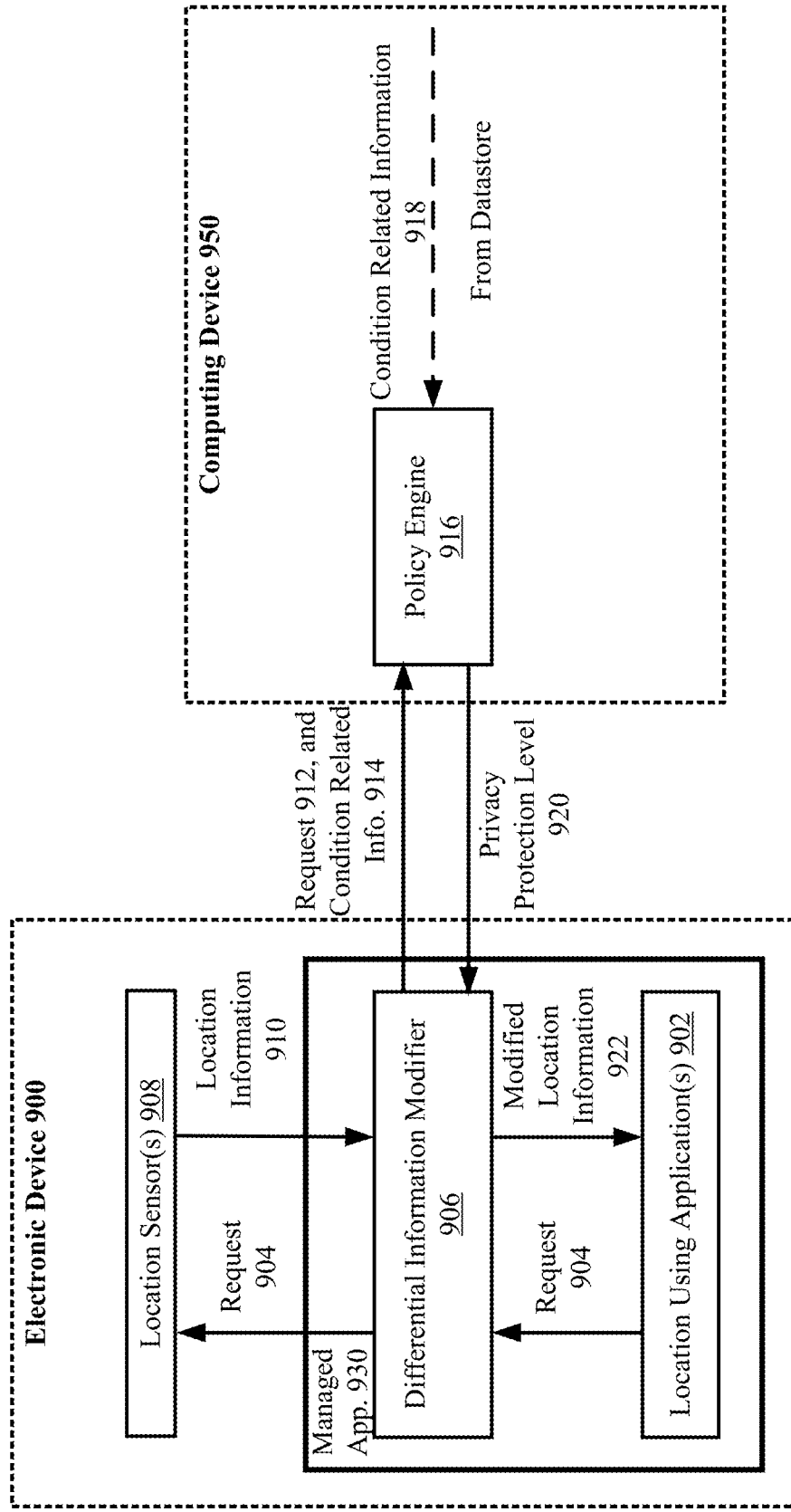
FIG. 9 provides an illustration that is useful for understanding a managed application based workflow implemented by a managed application and a remote computing device.

Referring now to FIG. 9, there is provided an illustration that is useful for understanding a managed application based workflow implemented by a managed application 930 and a remote computing device 950. Electronic device 900 can be the same as or similar to electronic device 102i, . . . , or 102$_N$ of FIG. 1. Similarly, computing device 950 can be the same as or similar to computing device 106 of FIG. 1. As such, the discussion provided above in relation to these devices of FIG. 1 is sufficient for understanding the devices of FIG. 9.

In managed application scenarios, the differential information modifier 906 and location using application(s) 902 are integrated with each other so as to form a single component 930 (e.g., managed application). Instead of querying the location sensor 908, the software application 902 sends a request for location information 904 to the privacy protection framework 906, 916. The privacy protection framework 906, 916 then obtains the location information 910 from the location sensor(s) 908. After processing the privacy protection, the privacy protection framework 906, 916 answers the request 904 from the location using application 902. If the software application 902 comprises a plurality of modules or micro-applications that can request location information at the same time, the privacy protection framework 906, 916 can provide different privacy protection levels respectively for the modules or micro-applications, which also ensures high flexibility to customer experiences.

The managed application based workflow involves: sending a request for location information 904 from a software application 902 to a differential information modifier 906; forwarding the request 904 to a location sensor 908; communicating location information 910 from the location sensor 908 to the differential information modifier 906 in response to the request 904; sending a request for a privacy protection level 912 along with condition related information 914 from the differential information modifier 906 to a policy engine 916; optionally performing operations by the policy engine 916 to retrieve other condition related information 918 from a datastore; analyzing by the policy engine 916 the condition related information 914, 918; determining a privacy policy level based on results of the policy engine's analysis of the condition related information; communicating the privacy policy level 920 from the policy engine 916 to the differential information modifier 906; remapping or obscuring the location information 910 so as to generate modified location information 922; and providing the modified location information 922 to the location using application 902.

Virtualized Application Based Workflow

Figure 10:
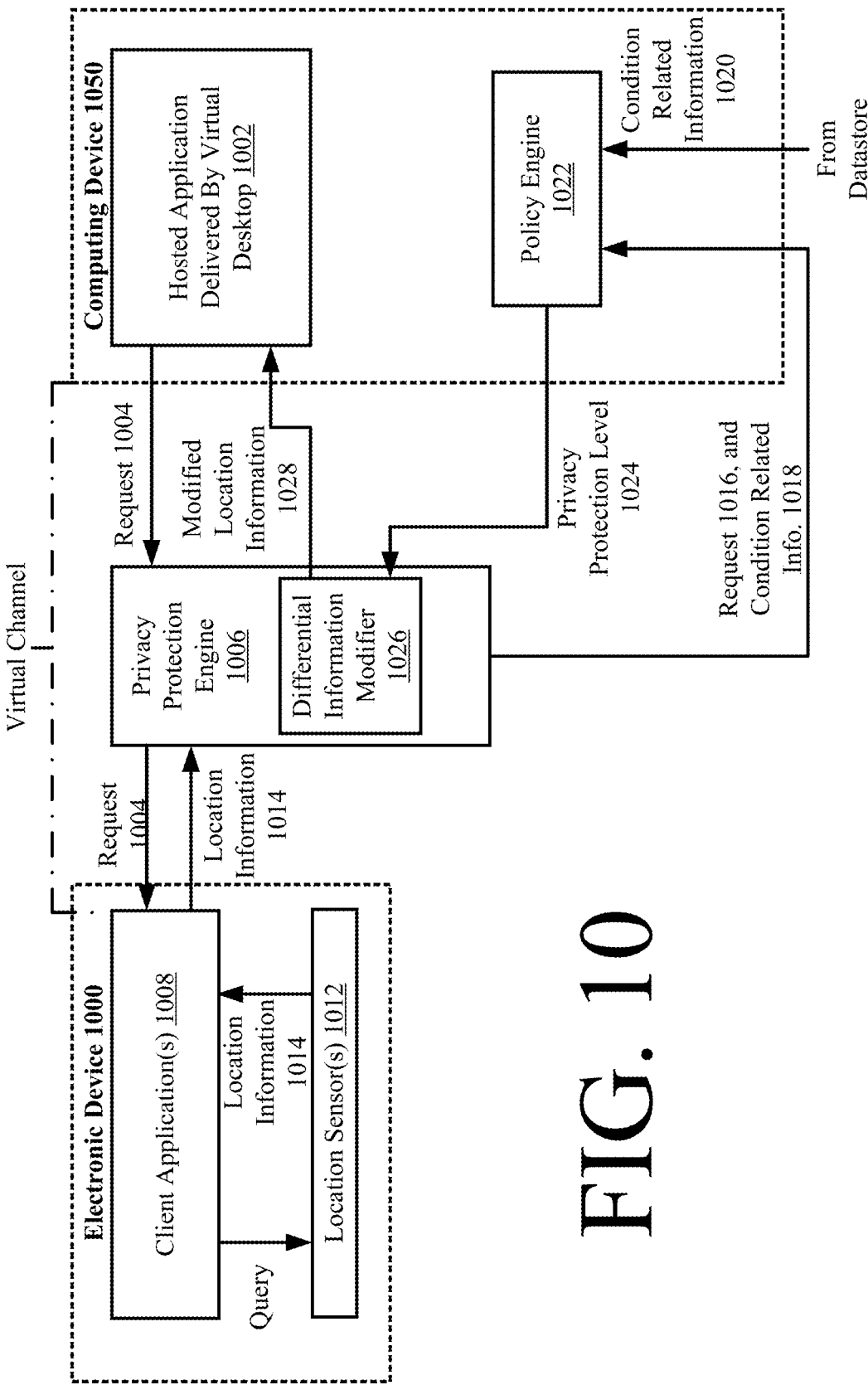
FIG. 10 provides an illustration that is useful for understanding a virtual application based workflow implemented by a managed virtual channel and a remote computing device.

Referring now to FIG. 10, there is provided an illustration that is useful for understanding a virtual application based workflow implemented by an electronic device 1000 and a remote computing device 1050. Electronic device 1000 can be the same as or similar to electronic device 102i, . . . , or 102$_N$ of FIG. 1. Similarly, computing device 1050 can be the same as or similar to computing device 106 of FIG. 1. As such, the discussion provided above in relation to these devices of FIG. 1 is sufficient for understanding the devices of FIG. 10.

In some virtual application scenarios (e.g., Citrix XenApp and XenDesktop scenarios), a hosted application 1002 is installed on a computing device 1050. This hosted application 1002 and a Software as a Service ("SaaS") application are securely delivered to electronic device 1000 (e.g., edge devices or endpoints) via a privacy protection engine 1006. The privacy protection engine 1006 includes, but is not limited to, an HDX engine.

A portion of the privacy protection framework (such as differential information modifier 1026) can be implemented in the privacy protection engine 1006. Accordingly, the privacy protection framework including 1022, 1026 is able to intercept location information passing between the electronic device 1000 and the hosted application 1002 and intercept location information passing between the electronic device 1000 and SaaS application(s). More specifically, the differential information modifier 1026 is able to obtain precise location information from the electronic device 1000 and return remapped or obscured location information to the hosted application 1002 or SaaS application(s) based on results of a contextual analysis.

For example, when an SaaS application is accessed via a virtualized browser and the SaaS application needs access to the electronic device's location for commercial advertisement or tracking purposes, the privacy protection framework including 1022, 1026 is able to protect the privacy of the person's whereabouts in accordance with a context based policy.

The visualized application based workflow involves: sending a request for location information 1004 from a hosted application 1002 to a privacy protection engine 1006; forwarding the request 1004 to a client application 1008 of the electronic device 1000; performing operations by the client application 1008 to obtain location information 1014 from a location sensor 1012; receiving by the client application 1008 location information 1014 from the location sensor 1012; communicating the location information 1014 from the electronic device 1000 to the privacy protection engine 1006; sending a request for a privacy protection level 1016 along with condition related information 1018 from the privacy protection engine 1006 to a policy engine 1022 of computing device 1050; optionally performing operations by the policy engine 1022 to retrieve other condition related information 1020 from a datastore; analyzing by the policy engine 1022 the condition related information 1018, 1020; determining a privacy policy level based on results of the policy engine's analysis of the condition related information; communicating the privacy policy level 1024 from the policy engine 1022 to a differential information modifier 1026 of the privacy protection engine 1006; remapping or obscuring the location information 1014 so as to generate modified location information 1028; and providing the modified location information 1028 to the hosted application 1002.

The present solution is not limited to the architecture shown in FIG. 10. For example, the policy engine 1022 can alternatively be a separate component from the computing device 1050. In this scenarios, the present solution is an independent solution.

Figure 11:
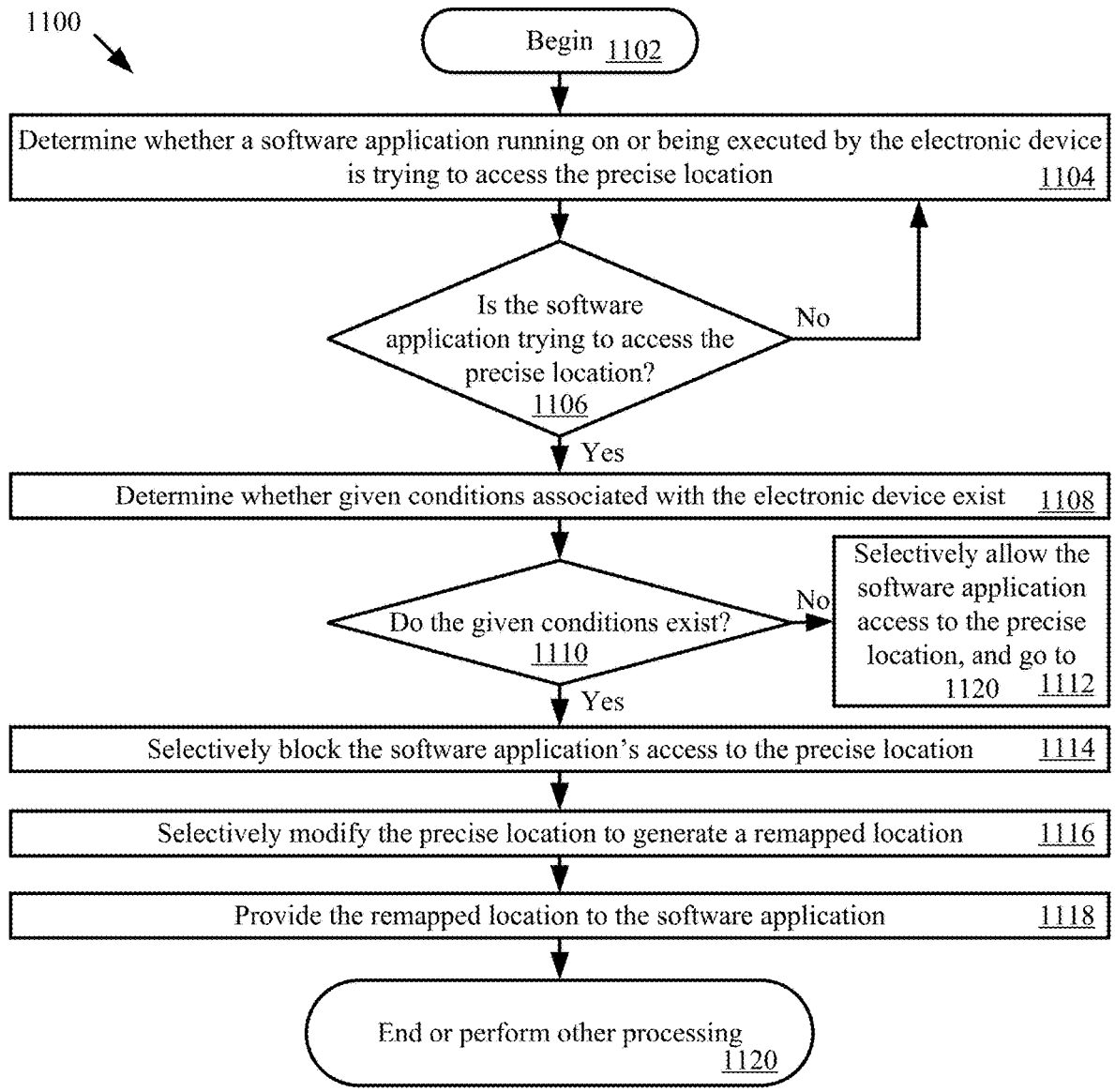
FIG. 11 provides a flow diagram of an illustrative method for providing privacy protection with regard to a precise location of an electronic device.

Referring now to FIG. 11, there is provided a flow diagram of an illustrative method 1100 for providing privacy protection with regard to a precise location of an electronic device (e.g., electronic device $102_1, \ldots, 102_N$ of FIG. 1). The method 1100 begins with 1102 and continues with 1104 where a determination is made as to whether a software application (e.g., software application 258 of FIG. 2) running on or being executed by the electronic device is trying to access the precise location (e.g., location information 260 of FIG. 2). If not [1106:NO], then method 1100 returns to 1104. In some scenarios, this is achieved at the Operating System ("OS") level based on event detection and analysis, as should be understood.

If so [1106:YES], then 1108 is performed where a determination is made as to whether given conditions associated with the electronic device exist. The existence of given conditions is detected based on condition related information specifying an electronic device context. The condition related information is obtained from the electronic device or a remote datastore (e.g., datastore 108 of FIG. 1). The electronic device context is a product of at least one of the electronic device's owner, the software application's user, the software application's type, the software application's reputation, a heading direction, the precise location, a date and a time.

If not [1110:NO], then method 1100 continues with 1112 where the software application is allowed access to the precise location. Subsequently, 1120 is performed where method 1100 ends or other processing is performed.

If so [1110:YES], then 1114-1118 are performed. 1114 involves blocking the software application's access to the precise location. In some scenarios, the blocking comprises: determining a privacy protection level value based on the condition related information; and comparing the privacy protection level value to a threshold value. 1116 involves modifying the precise location to generate a remapped location. The selectively modification comprises randomly selecting a location within a circular geographic area representing a privacy protection level associated with the electronic device. The circular geographic area has (1) a center point comprising the precise location of the electronic device and (b) a radius selected based on a privacy protection level determined based on the given conditions. First and second privacy protection levels have different radius. 1118 involves providing the remapped location to the software application. Subsequently, 1120 is performed where method 1100 ends or other processing is performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method, comprising:
receiving, by an electronic device, a request from an application to receive data, the data indicative of a physical location of the electronic device;
blocking, by the electronic device, the application from access to the data in response to the received request so as to prevent transfer of the data to the application;
determining, by the electronic device, a geographic area that includes a center point and a radius, the center point indicative of the physical location of the electronic device and the radius being selectable based on (1) ownership of the electronic device, (2) reputation of the application, (3) heading information of the electronic device, and (4) the physical location of the electronic device;
selecting, by the electronic device, a location within the geographic area defined by the selected radius, the selected location being different than the physical location of the electronic device; and
providing, by the electronic device, the selected location to the application so as to enable operation of the application without use of data that includes the physical location of the electronic device.

2. The method according to claim 1, wherein the radius is selected further based on at least one of the application's user, the application's type, a date and a time.

3. The method according to claim 1, wherein the blocking comprises comparing a privacy protection level value to a threshold value.

4. The method according to claim 1, wherein the location in the geographic area defined by the selected radius, is randomly selected.

5. The method according to claim 4, wherein the geographic area has a radius selected based on a privacy protection level.

6. The method according to claim 5, wherein the privacy protection level is a first privacy protection level associated with the electronic device, the method further includes determining a second privacy protection level associated with the electronic device, the second privacy protection level being different from the first privacy protection level.

7. The method according to claim 1, wherein the application is allowed access to the location data in response to a privacy protection level being equal to or greater than a threshold value.

8. An electronic device, comprising:
a circuit configured to:
receive a request from an application to receive data, the data indicative of a physical location of the electronic device;

block the application from access to the data in response to the received request so as to prevent transfer of the data to the application;

determine a geographic area that includes a center point and a radius, the center point indicative of the physical location of the electronic device and the radius being selectable based on (1) ownership of the electronic device, (2) reputation of the application, (3) heading information of the electronic device, and (4) the physical location of the electronic device;

select a location within the geographic area defined by the selected radius, the selected location being different than the physical location of the electronic device; and providing, by the electronic device, the selected location to the application so as to enable operation of the application without use of data that includes the physical location of the electronic device.

9. The electronic device of claim 8, wherein the radius is selected further based on at least one of the application's user, the application's type, a date and a time.

10. The electronic device of claim 8, wherein the access to the data is blocked based on results from comparing a privacy protection level value to a threshold value.

11. The electronic device of claim 8, wherein the location, in the geographic area defined by the selected radius, is randomly selected.

* * * * *